US012776244B2

(12) United States Patent
Yang et al.

(10) Patent No.: US 12,776,244 B2

(45) Date of Patent: Oct. 27, 2026

(54) DISPLAY PANEL AND DISPLAY DEVICE

(71) Applicant: TCL CHINA STAR OPTOELECTRONICS TECHNOLOGY CO., LTD., Shenzhen (CN)

(72) Inventors: Zelin Yang, Shenzhen (CN); Liu Yang, Shenzhen (CN); Wei Li, Shenzhen (CN); Xiaohui Yao, Shenzhen (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 19/190,776

(22) Filed: Apr. 27, 2025

(65) Prior Publication Data

US 2026/0212798 A1 Jul. 23, 2026

(30) Foreign Application Priority Data

Jan. 20, 2025 (CN) ......................... 202510088111.0

(51) Int. Cl.
*G09G 3/20* (2006.01)

(52) U.S. Cl.
CPC ... *G09G 3/2092* (2013.01); *G09G 2310/0267* (2013.01); *G09G 2310/061* (2013.01); *G09G 2310/08* (2013.01); *G09G 2330/021* (2013.01)

(58) Field of Classification Search
CPC ........... G02F 1/13454; G02F 1/136286; G02F 1/1368; G02F 2201/56; G02F 1/13306;
(Continued)

(56) References Cited

U.S. PATENT DOCUMENTS

| | | | | |
|---|---|---|---|---|
| 10,600,360 | B2 * | 3/2020 | Nonaka | H10K 59/121 |
| 2021/0003897 | A1 * | 1/2021 | Yu | G02F 1/136286 |
| 2024/0420621 | A1 * | 12/2024 | Zhang | G09G 3/20 |

FOREIGN PATENT DOCUMENTS

| | | | |
|---|---|---|---|
| CN | 109658824 | A | 4/2019 |
| CN | 109872636 | A | 6/2019 |

(Continued)

OTHER PUBLICATIONS

Chinese Office Action issued in corresponding Chinese Patent Application No. 202510088111.0 dated Sep. 3, 2025, pp. 1-8.

(Continued)

*Primary Examiner* — Nelson M Rosario

(74) *Attorney, Agent, or Firm* — PV IP PC; Peter Stecher; Wei Te Chung

(57) ABSTRACT

The application provides a display panel and display device; in the display panel, by having the gate driving circuit comprise a plurality of stages of first gate driving units in a cascaded configuration and at least one stage of second gate driving unit, the first gate driving unit is configured to output a scanning signal, the second gate driving unit is configured to output a stage transmission signal to a corresponding one or more first gate driving units. In a direction perpendicular to the arrangement direction of each of the stages of the first gate driving units, a width of the second gate driving unit is less than a width of the corresponding one or more of first gate driving units.

9 Claims, 7 Drawing Sheets

(58) Field of Classification Search
CPC .. G06F 3/1446; G09G 3/3208; G09G 3/3266; G09G 2310/0267; G09G 2310/0286; G09G 3/2085; H10D 86/431; H10D 86/60; H10K 59/10; H10K 59/121; H10K 59/131; H10K 59/18; H10K 59/805; H10K 59/8731; H10K 59/88; H10K 59/1315
See application file for complete search history.

(56) References Cited

FOREIGN PATENT DOCUMENTS

| | | | |
|---|---|---|---|
| CN | 114944124 | A | 8/2022 |
| CN | 115862511 | A | 3/2023 |
| CN | 117456943 | A | 1/2024 |
| CN | 117975856 | A | 5/2024 |
| CN | 119091779 | A | 12/2024 |
| WO | 2021184543 | A1 | 9/2021 |

OTHER PUBLICATIONS

Chinese Office Action issued in corresponding Chinese Patent Application No. 202510088111.0 dated Feb. 13, 2026, pp. 1-7.

* cited by examiner

DISPLAY PANEL AND DISPLAY DEVICE

CROSS-REFERENCE TO RELATED APPLICATION

This application claims the benefit of Chinese Patent Application No. CN 202510088111.0 filed on Jan. 20, 2025 and entitled "DISPLAY PANEL AND DISPLAY DEVICE", the disclosures of which are incorporated by reference herein in their entirety.

TECHNICAL FIELD

The present application relates to the technical field of display, and in particular, relates to a display panel and display device.

BACKGROUND

GOA (Gate On Array, array substrate row driving) technology refers to a driving method of fabricating a gate line scanning driving signal on the array substrate to realize a row-by-row scanning of the gate. Since GOA technology can eliminate the need for the gate driving chip and the circuit board, save space in the gate driving chip and the circuit board, and achieve narrow bezel, GOA technology is widely used on display panel. The gate driving circuit is usually disposed on the bezels at two sides of the existing display device, binding the driving chip to the bezel at lower side. However, in the process of actually fabricating, it is found that the gate driving circuit is set at the junction between the bezels at two sides and the bezel at lower side, which occupies the lower bezel of the display device, resulting in the space for trace of the lower bezel decreases, and easily resulting in issues such as short circuit and open circuit of the traces, thereby affecting the yield and performance of the display device.

Therefore, the existing display device has the technical problem that the gate driving circuit occupies the lower bezel of the display device, resulting in other traces are easily to be abnormal, thereby affecting the yield and performance of the display device.

SUMMARY

The embodiment of the present application provides a display panel and display device to solve the technical problem that the gate driving circuit occupies the lower bezel of the display device, resulting in other traces are easily to be abnormal, thereby affecting the yield and performance of the display device.

In order to achieve the aforementioned object, according to the first aspect of the present application, providing a display panel, the display panel comprises a gate driving circuit, the gate driving circuit comprises a plurality of stages of first gate driving units in a cascaded configuration and at least one stage of second gate driving unit, each of the first gate driving units is configured to output a scanning signal, the second gate driving unit is configured to output a stage transmission signal to a corresponding one or more of the first gate driving units;

where in a direction perpendicular to the arrangement direction of each of the stages of the first gate driving units, a width of the second gate driving unit is less than a width of the corresponding one or more of the first gate driving units.

According to the second aspect of the present application, providing a display device, the display device comprises any one of the aforementioned display panel.

The embodiment of the present application provides a display panel and display device. In the display panel, the gate driving circuit comprises a plurality of stages of first gate driving units in a cascaded configuration and at least one stage of second gate driving unit, each of the first gate driving units is configured to output a scanning signal, the second gate driving unit is configured to output a stage transmission signal to a corresponding one or more first gate driving units. In a direction perpendicular to the arrangement direction of each of the stages of the first gate driving units, the width of the second gate driving unit is less than the width of the corresponding one or more of the first gate driving units, the space of the lower bezel occupied by the second gate driving unit can be reduced, so that the space for setting other traces in the lower bezel is increased, thereby reducing the risk of short circuit and open circuit of the traces of the lower bezel, increasing the yield of the display panel.

Other features and advantages of the present application will be described in detail in the subsequent specific embodiment.

DETAILED DESCRIPTION OF THE PREFERRED EMBODIMENTS

To more clearly illustrate the technical solutions in the embodiments of the present application, a brief introduction to the drawings required for the description of the embodiments is provided below. Apparently, the drawings described below are merely some embodiments of the present application. For those skilled in the art, other drawings can be derived from these drawings without creative effort.

To understand the present application and the beneficial effects thereof more completely, the following description will be made in conjunction with the accompanying drawings, wherein the same reference numerals refer to the same parts in the following description.

IMPLEMENTATIONS OF THE PRESENT APPLICATION

Figure 1:
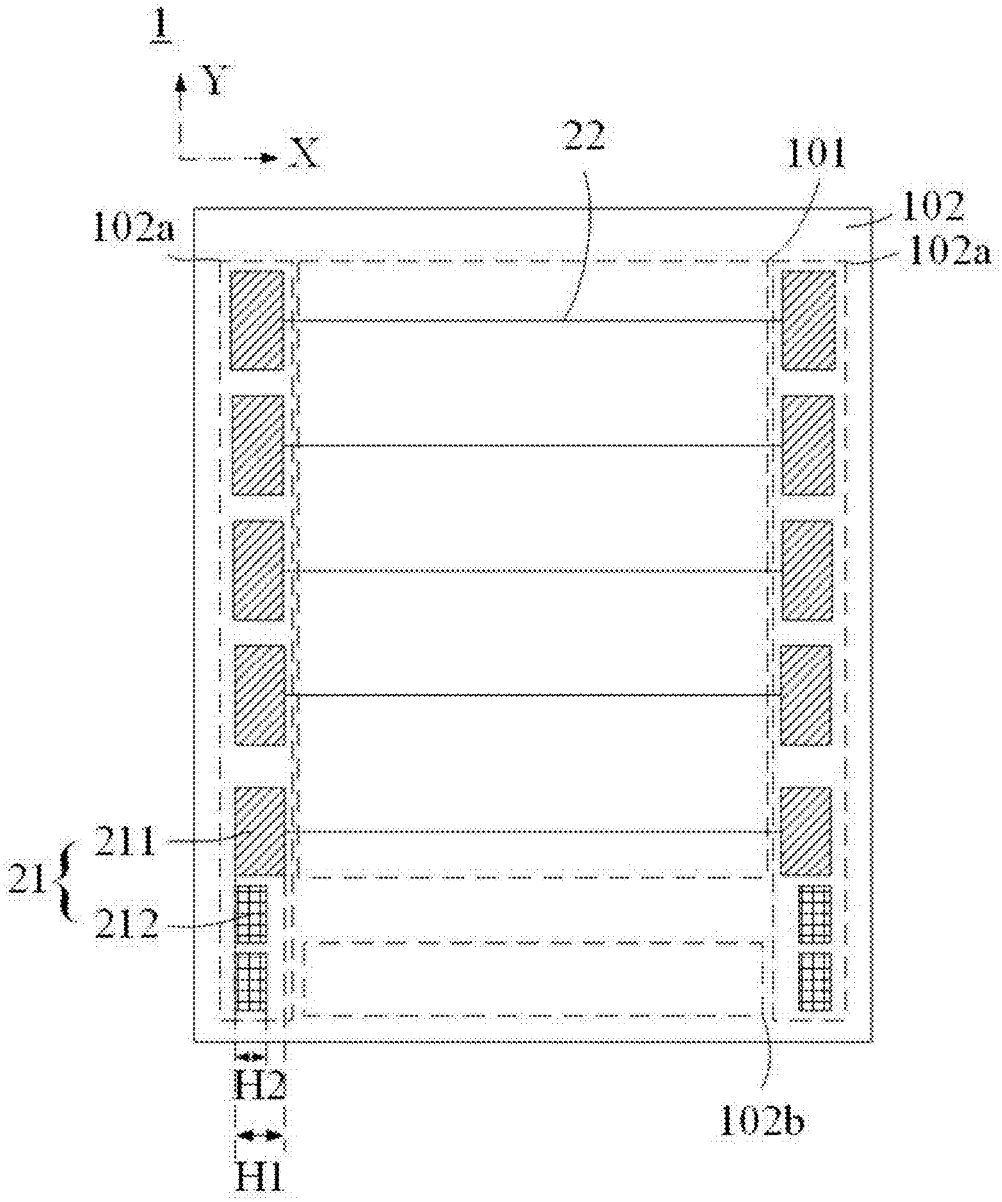
FIG. 1 is a plan view of the display panel provided by the embodiment of the present application.

The technical solutions in the embodiments of the present application will be clearly and completely described below with reference to the accompanying drawings in the embodiments of the present application. Obviously, the described embodiments are only some of the embodiments of the present application, but not all of the embodiments. Based on the embodiments in this application, all other embodiments obtained by those skilled in the art without creative efforts fall within the protection scope of this application.

In the description of the present application, it should be noted that unless otherwise specified and defined, the terms “installed”, “connected”, “electrically connected” should be understood in a broad sense, for example, may be a fixed connection, a removable connection, or an integral connection; may be a mechanical connection, an electrical connection or may communicate with each other; may be direct connection, or indirect connection through an intermediate medium, may be a communication within two elements or an interaction relationship between the two elements. For those skilled in the art, the specific meaning of the above terms in this application can be understood in accordance with the specific circumstances.

In order to illustrate the principle of arising from technical problems in the present application, the embodiment of the present application provides a comparison display device, which can be understood that the comparison display device is not used as the prior art of the present application. Specifically, the comparison display device comprises a plurality of stages of gate driving circuits in a cascaded configuration. In order to achieve the normal operation of the gate driving circuit, three types of gate driving circuits are generally set, the first type of gate driving circuit, the second type of gate driving circuit and the third type of gate driving circuit are disposed sequentially from the upper bezel to the lower bezel. The first type of gate driving circuit is connected to a start signal line, enabling the gate driving circuit to output stage transmission signal and scanning signal according to the signal of the start signal line. The second type of gate driving circuit receives stage transmission signals and scanning signal of another stage of the gate driving circuit, and outputs the stage transmission signals and scanning signals. The third type of gate driving circuit only outputs the stage transmission signal to other gate driving circuits, enabling the gate driving circuit to operate normally and not to be connected to the scanning line in the comparison display device.

However, in the comparison display device, the circuit design of the three types of gate driving circuits is the same. The difference between the first type of gate driving circuit and the second and third type of gate driving circuit is that the input terminal of the first type of gate driving circuit is connected to the start signal line, and the input terminals of the second type of gate driving circuit and the third type of gate driving circuit are connected to the stage transmission signal line and signal output line. The difference between the third type of gate driving circuit and the first and second type of gate driving circuit is that the third type of gate driving circuit is not connected to the scanning line, and the first type of gate driving circuit and the second type of gate driving circuit are connected to the scanning line. Generally, a single-stage circuit requires 15 or more transistors to achieve the function of outputting the scanning signal, however, the circuit design of the three types of gate driving circuits is the same as each other, causing the third type of gate driving circuit to occupy the space of the lower bezel. The lower bezel is usually provided with a data signal trace to connect a source driving chip, the configuration of the comparison display device reduces the space for setting the data signal trace, which can easily result in the issues of short circuit or open circuit between the data signal traces, or result in the impedance of the data signal trace being increased, an excessive signal voltage drop, which may cause poor display quality or display failure. Therefore, the existing display device has a technical problem that the gate driving circuit occupies the lower bezel of the display device, causing other traces to be prone to abnormalities, thereby affecting the yield of the display device.

In order to address the aforementioned technical problems, the embodiment of the present application provides a display panel and display device to solve the aforementioned technical problems.

Figure 2:
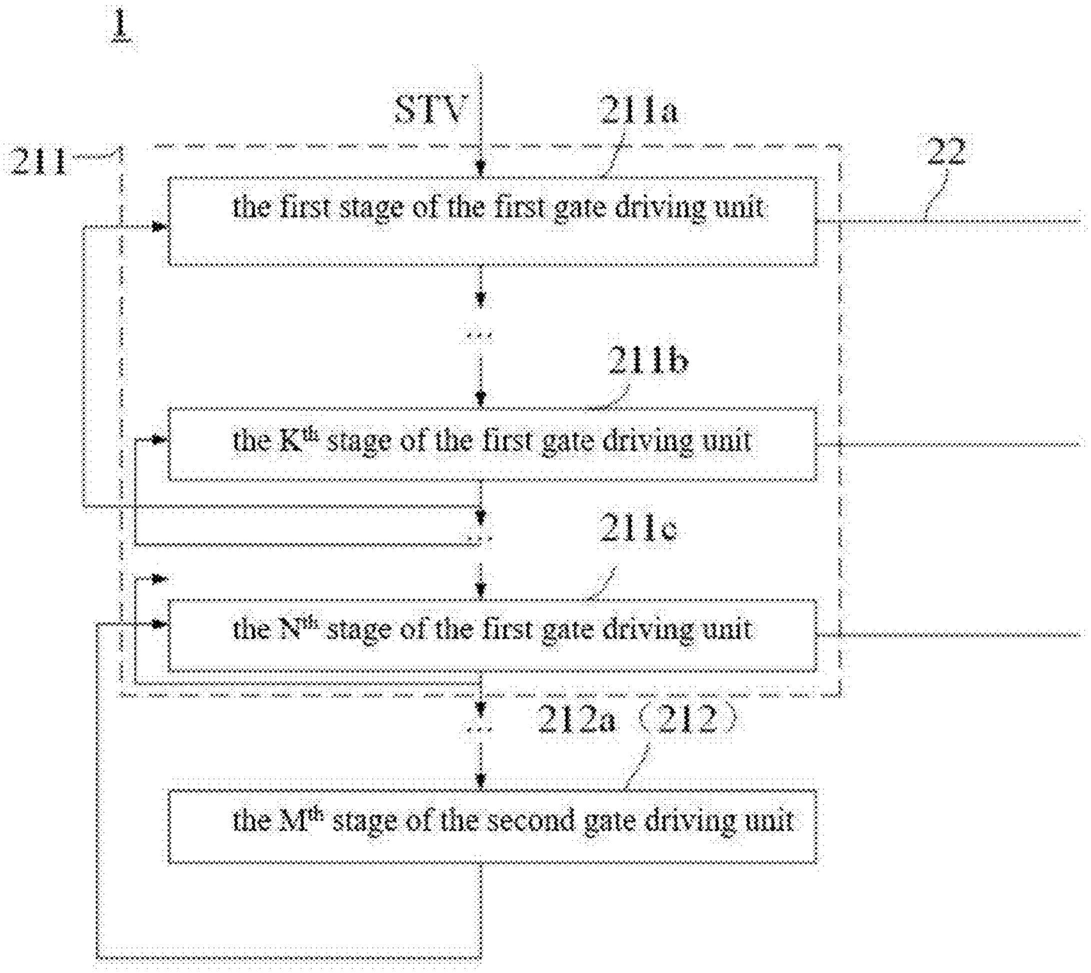
FIG. 2 is a cascaded diagram of the gate driving circuit of the display panel provided by the embodiment of the present application.
Figure 3:
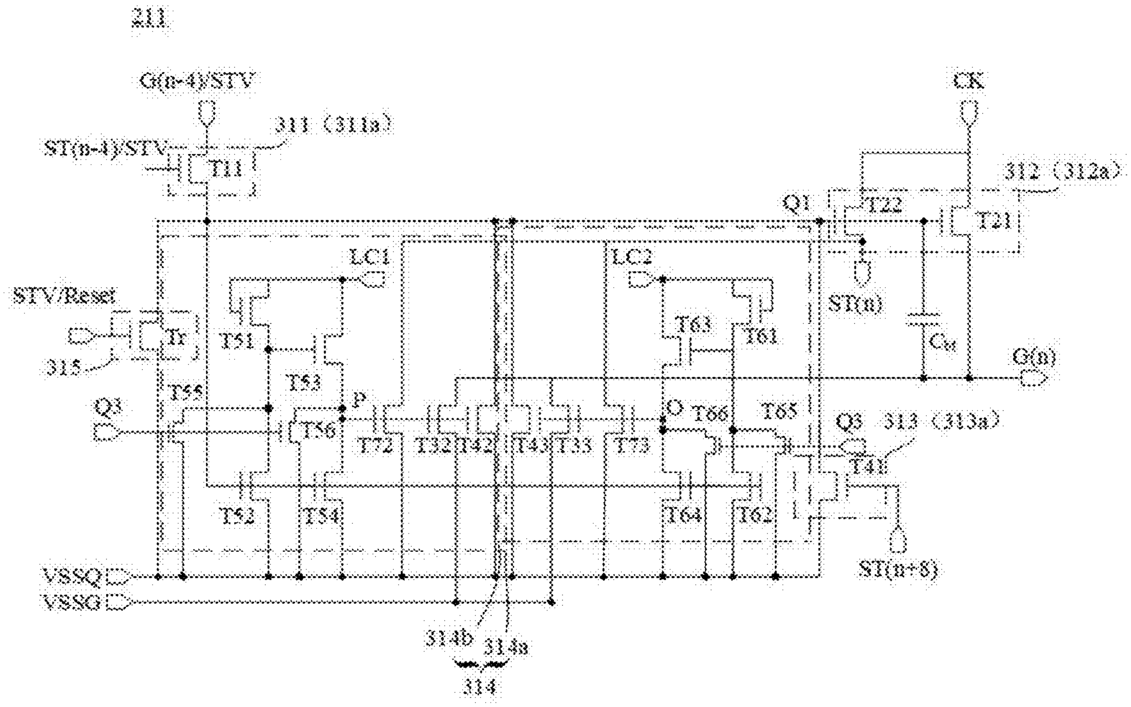
FIG. 3 is a circuit diagram of the first gate driving unit provided by the embodiment of the present application.
Figure 4:
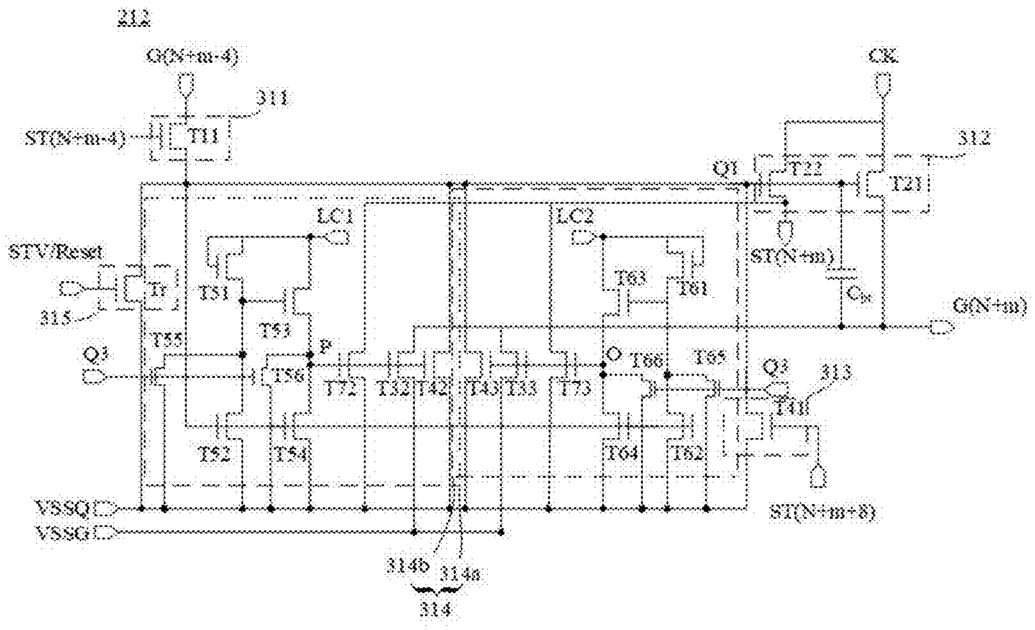
FIG. 4 is a first circuit diagram of the second gate driving unit provided by the embodiment of the present application.
Figure 5:
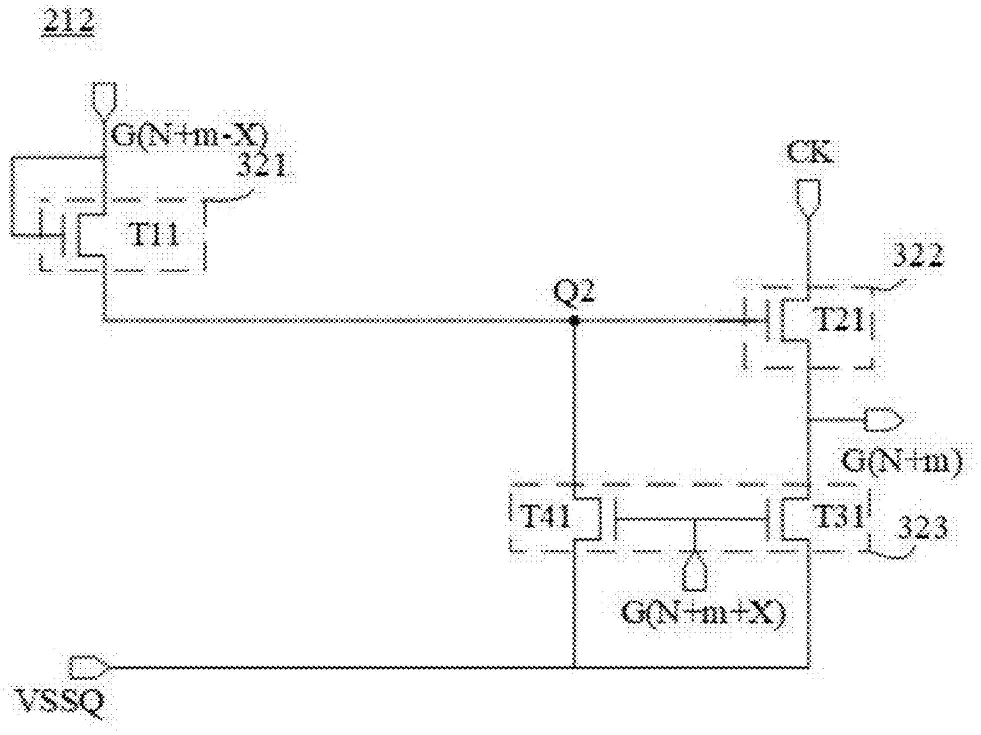
FIG. 5 is a second circuit diagram of the second gate driving unit provided by the embodiment of the present application.
Figure 6:
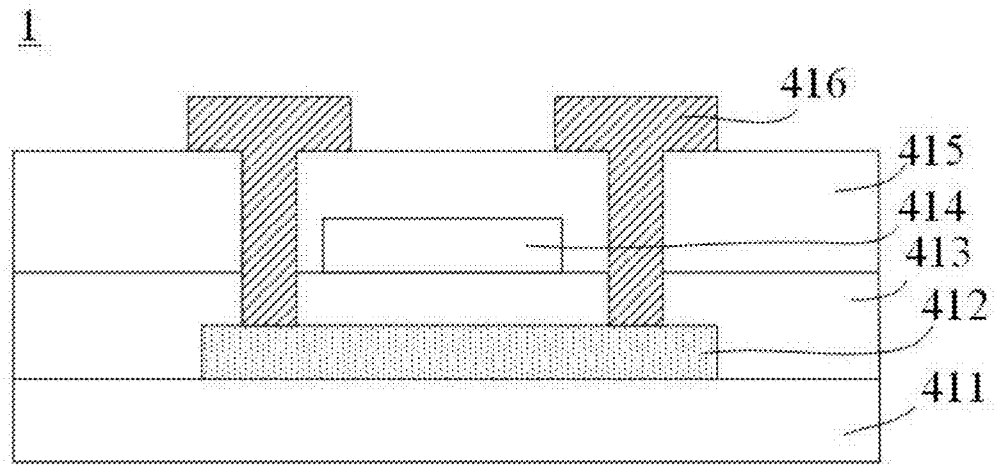
FIG. 6 is a cross-sectional diagram of the display panel provided by the embodiment of the present application.
Figure 7:
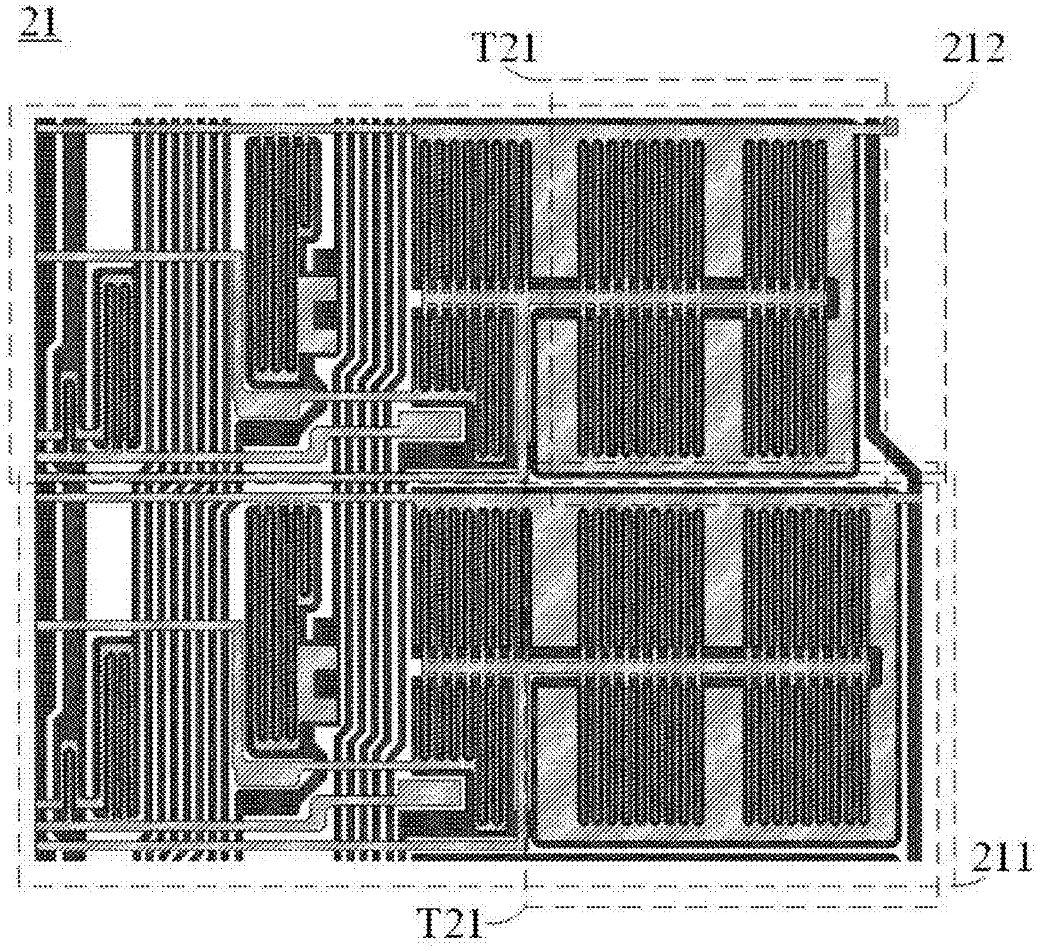
FIG. 7 is a first stack diagram of each film layer in the first gate driving unit and the second gate driving unit provided by the embodiment of the present application.
Figure 8:
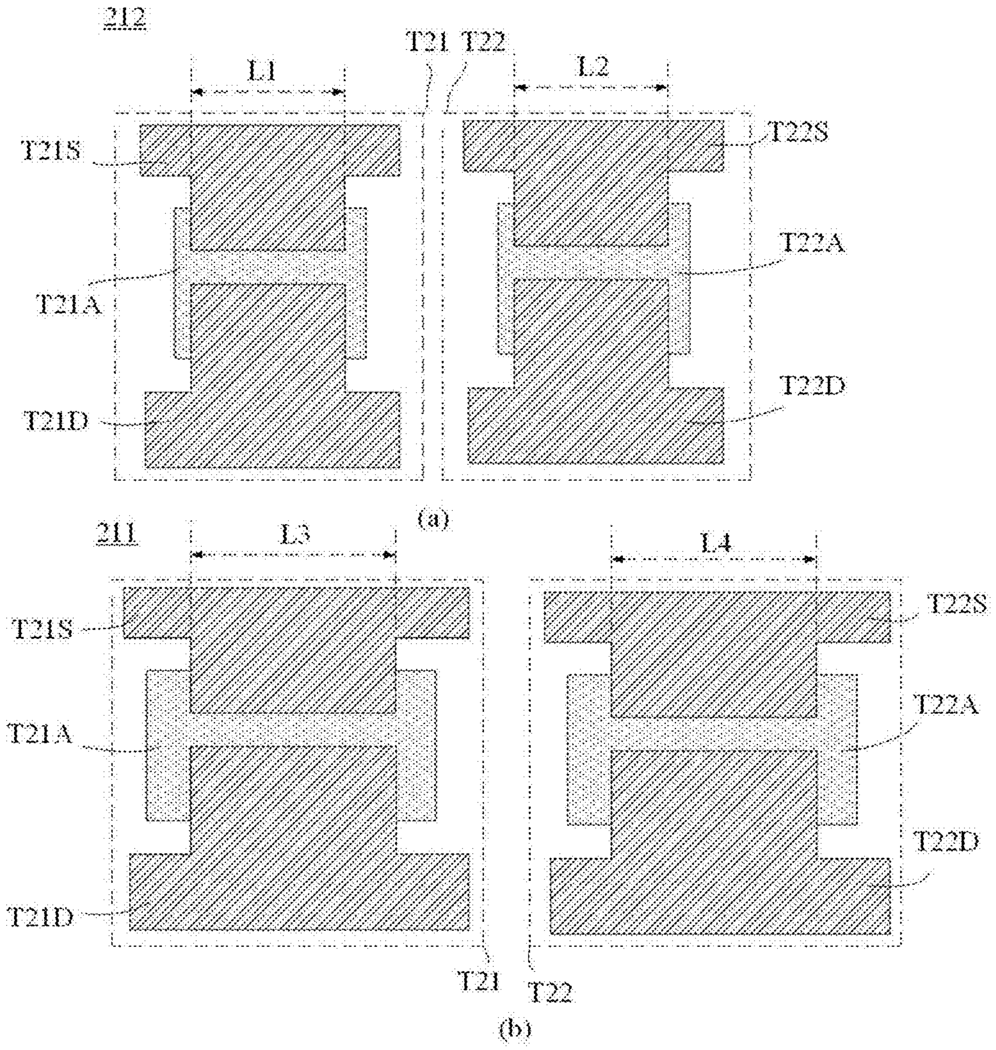
FIG. 8 is a second stack diagram of each film layer in the first gate driving unit and the second gate driving unit provided by the embodiment of the present application.
Figure 9:
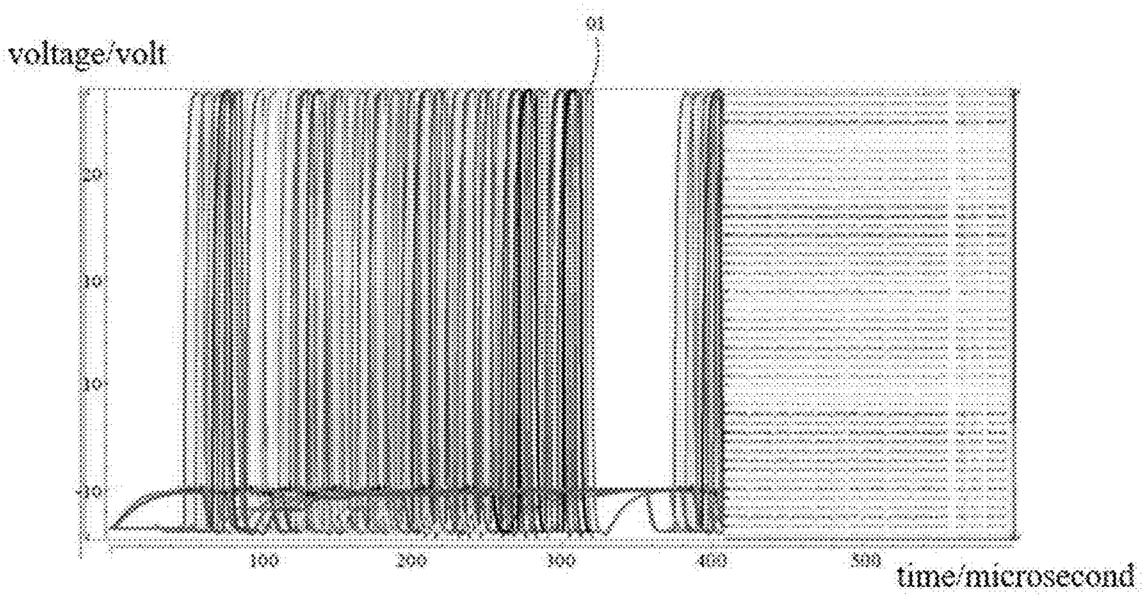
FIG. 9 is a clock timing diagram of the output signal of the gate driving circuit provided by the embodiment of the present application.

FIG. 1 is a plan view of the display panel provided by the embodiment of the present application. FIG. 2 is a cascaded diagram of the gate driving circuit of the display panel provided by the embodiment of the present application. FIG. 3 is a circuit diagram of the first gate driving unit provided by the embodiment of the present application. FIG. 4 is a first circuit diagram of the second gate driving unit provided by the embodiment of the present application. FIG. 5 is a second circuit diagram of the second gate driving unit provided by the embodiment of the present application. FIG. 6 is a cross-sectional diagram of the display panel provided by the embodiment of the present application. FIG. 7 is a first stack diagram of each film layer in the first gate driving unit and the second gate driving unit provided by the embodiment of the present application. FIG. 8 is a second stack diagram of each film layer in the first gate driving unit and the second gate driving unit provided by the embodiment of the present application. FIG. 9 is a clock timing diagram of the output signal of the gate driving circuit provided by the embodiment of the present application.

As shown from FIG. 1 to FIG. 9, the embodiment of the present application provides a display panel, the display panel 1 comprises a gate driving circuit 21, the gate driving circuit 21 comprises a plurality of stages of first gate driving units 211 in a cascaded configuration and at least one stage of second gate driving unit 212, each of the first gate driving units 211 is configured to output a scanning signal, the second gate driving unit 212 is configured to output a stage transmission signal to a corresponding one or more first gate driving units 211;

In a direction X perpendicular to the arrangement direction Y of each of the stages of the first gate driving units, a width H2 of the second gate driving unit 212 is less than a width H1 of the corresponding one or more of the first gate driving units 211.

The embodiment of the present application provides a display panel, in the display panel 1, by having the gate driving circuit 21 comprise a plurality of stages of first gate driving units 211 in a cascaded configuration and at least one stage of second gate driving unit 212, each of the first gate driving units 211 is configured to output a scanning signal, the second gate driving unit 212 is configured to output a stage transmission signal to the corresponding one or more of the first gate driving units 211. In a direction perpendicular to the arrangement direction of each of the stages of the first gate driving units 211, the width of the second gate driving unit 212 is less than the width of the corresponding one or more of the first gate driving units, the space of the lower bezel occupied by the second gate driving unit 212 can be reduced, so that the space for setting other traces in the lower bezel is increased, thereby reducing the risk of short circuit and open circuit of the traces of the lower bezel, increasing the yield of the display panel.

Specifically, the scanning signal output by the first gate driving unit 211 refers to the signal output to the scanning line 22, the stage transmission signal output to the first gate driving unit 211 by the second driving unit 212 refers to the signal output from the stage transmission signal terminal or the signal output terminal of the second gate driving unit 212. It can be understood that, when the second gate driving unit 212 is provided with the stage transmission signal terminal, the stage transmission signal output by the second gate driving unit 212 is the signal output from the stage transmission signal terminal. When the second gate driving unit 212 is not provided with the stage transmission signal terminal, the signal output terminal of the second gate driving unit 212 further acts as the stage transmission terminal, the signal output terminal of the second gate driving unit 212 outputs the stage transmission signal.

Specifically, the arrangement direction of the first gate driving unit 211 is Y direction, the direction perpendicular to the arrangement direction of each of the stages of the first gate driving units 211 is X direction.

As shown from FIG. 1 to FIG. 9, the embodiment of the present application provides a display panel, the display panel 1 comprises a gate driving circuit 21 and a scanning line 22, the gate driving circuit 21 comprises a plurality of stages of first gate driving units 211 in a cascaded configuration and at least one stage of second gate driving unit 212, the signal output terminal of each of the first gate driving units 211 (for example, the signal output terminal G(n) of the $n^{th}$ first gate driving unit) is connected to the scanning line 22, the stage transmission signal terminal of the second gate driving unit 212 (for example, the stage transmission signal terminal (n+m) of the $M^{th}$ second gate driving unit) or the signal output terminal of the second gate driving unit 212 is electrically connected to the first gate driving unit 211;

A channel width of a transistor in at least one stage of the second gate driving unit 212 is less than a channel width of a corresponding transistor in the corresponding one or more of the first gate driving units 211 (for example, in FIG. 6 and FIG. 7, the channel width L1 of the first pull-up transistor T21 in the second gate driving unit 212 is less than the channel width L3 of the first pull-up transistor T21 in the first gate driving unit 211);

and/or, the number of the transistors in at least one stage of the second gate driving unit 212 is less than the number of the transistors in the corresponding one or more of the first gate driving units 211 (for example, in FIG. 3 and FIG. 4, there are only 4 transistors in the second gate driving 212, there are 19 transistors in the corresponding one or more of the first gate driving units).

The embodiment of the present application provides a display panel, in the display panel, by having the gate driving circuit 21 comprise a plurality of stages of first gate driving units 211 in a cascaded configuration and at least one stage of second gate driving unit 212, the signal output terminal of each of the first gate driving units 211 is connected to the scanning line 22, the stage transmission signal terminal or the signal output terminal of the second gate driving unit 212 is electrically connected to the first gate driving unit 211. The channel width of the transistor of at least one stage of the second gate driving unit 212 is less than the channel width of the corresponding transistor in the corresponding one or more of the first gate driving units 211, and/or, the number of the transistors in at least one stage of the second gate driving unit 212 is less than the number of the transistors in the corresponding one or more of the first gate driving units 211, the space of the lower bezel occupied by the second gate driving unit 212 can be reduced, so that the space for setting other traces in the lower bezel is increased, thereby reducing the risk of short circuit and open circuit of the traces of the lower bezel, increasing the yield of the display panel.

Specifically, as shown in FIG. 1, the display panel 1 comprises a display area 101 and a non-display area 102, the non-display area 102 can be configured to surround the display area 101, which is not limited in the embodiment of the present application, the non-display area 102 can be set at two sides or three sides of the display area 101, and the non-display area 102 can be bent to the backside of the display panel. The non-display area 102 can comprise an upper bezel region (not shown), a left bezel region (not shown), a right bezel region (not shown) and a lower bezel region (not shown), the left bezel region and the right bezel region can comprise a gate driving circuit arrangement region 102*a*, the lower bezel region can comprise a binding area 102*b*, the scanning line 22 is disposed in the display area 101, the gate driving unit 21 is disposed in the gate driving unit arrangement region 102*a*. However, the embodiment of the present application is not limited thereto, the gate driving circuit region can be set at a side of the display area, correspondingly, the binding area is set at the other side of the display area.

Specifically, in the embodiment of the present application, the binding area 102*b* can comprise all regions set at the lower side of the display area 101, except for the gate driving circuit arrangement region 102*a*, and can comprise a fan-out region. It can be understood that the binding area 102*b* can overlap with the gate driving circuit arrangement region 102*a*, since the gate driving circuit arrangement region 102*a* is not provided with the trace of the binding area 102*b*, the binding area 102*b* can be divided into the gate driving circuit arrangement region 102*a*. However, it can be understood that, in the gate driving circuit arrangement region 102*a*, there can also be some traces that pass through the binding area or the gate driving circuit arrangement region to bind with the chip.

Specifically, when the second gate driving unit comprises the signal output terminal and the stage transmission signal terminal, the stage transmission signal terminal of the second gate driving unit is allowed to be electrically connected to the first gate driving unit, when the second gate driving unit is only provided with the signal output terminal, it can be understood that, the signal output terminal further acts the stage transmission signal terminal, at this time, the signal output terminal of the second gate driving unit can be electrically connected to the first gate driving unit.

Specifically, it can be understood that, in order to achieve normal operation of the gate driving circuit, as shown in FIG. 2, using an example in which the gate driving circuit comprises N stages of the first gate driving unit and M stages of the second driving unit, this will cause the first stage of the first gate driving unit 211*a* to be connected to the start signal line STV and the signal terminal of the $K^{th}$ stage of the first gate driving unit 211*b*, the $K^{th}$ stage of the first gate driving unit 211*b* is connected to the signal terminal of another stage of the first gate driving units, the $N^{th}$ stage of the first gate driving unit 211*c* is connected to the stage transmission signal terminal or the signal output terminal of the $M^{th}$ stage of the second gate driving unit 212*a*, this allows each of the first gate driving units to be provided with an input signal which serves as the output signal of another stage of the first gate driving units. The specific value of K can be determined according to the different designs of the gate driving unit, and in the embodiment of the present application, using an example in which the $N^{th}$ stage of the first gate driving unit 211*c* is connected to the stage transmission signal terminal of the $M^{th}$ stage of the second gate driving unit 212*a*, the $N^{th}$ stage of the first gate driving unit is allowed to be connected to the stage transmission signal terminal of the Lth stage of the second gate driving unit, however, the embodiment of the present application is not limited thereto.

Specifically, N can be greater than or equal to 2, and N is a positive integer, K can be greater than or equal to 1, and K is less than or equal to N, K is a positive integer; M can be greater than or equal to 1, and M is a positive integer, L can be greater than or equal to 1, and L is less than or equal to M, L is a positive integer.

Specifically, the gate driving circuit 21 can comprise (N+M) stages of gate driving units.

It can be seen that the first gate driving unit is connected to the scanning line 22, and the second gate driving unit is not connected to the scanning line 22 (the second gate driving unit can be connected to a virtual signal line). However, in the comparison display device, the second gate driving circuit is the same in the circuit design as the third type of the gate driving circuit, this will result in the spaces occupied by the second type of the gate driving circuit and the third type of the gate driving circuit being close or even the same as each other, it can be seen from FIG. 1. Applying the design of the comparison display device to the embodiment of the present application will result in the second gate driving unit occupying more space. However, through the aforementioned design, the embodiment of the present application can reduce the space occupied by the second gate driving unit, this allows the line width and/or the line spacing of the traces in the binding area 102*b* to be increased, reducing the impedance of the trace, lowering the risk of open circuit and short circuit of the traces, increasing the display effect and yield of the display panel.

Specifically, it can be understood that, when N scanning lines 22 is needed to be driven in the display panel 1, N stages of the first gate driving units is at least disposed in the display panel, so that each of the scanning lines 22 can be connected to one stage of the first gate driving unit, achieving the driving of the scanning line 22. As for the configuration of the N stages of the first gate driving units, it is not limited in the embodiment of the present application, for example, a single-sided gate driving circuit design can be adopted, a double-sided gate driving circuit design can also be adopted. For example, the odd stage of the first gate driving unit can be set at the left bezel region, the even stage of the first gate driving unit can be set at the right bezel region, or the odd stage of the first gate driving unit and the even stage of the first gate driving unit are both disposed in one gate driving circuit arrangement region (under the condition that the double-sided gate driving circuits are adopted, the double-side are both provided with the odd stage of the first gate driving unit and the even stage of the first gate driving unit).

Specifically, in the embodiment of the present application, in order to illustrate the difference between the first gate driving unit and the second gate driving unit, they are named separately and classified into stages. However, it can be understood that, the first gate driving unit and the second gate driving unit are different stages of gate driving units in the gate driving circuit, when the $N^{th}$ stage of the first gate driving unit is the $N^{th}$ stage of the gate driving unit, the first stage of the second gate driving unit is actually the $(N+1)^{th}$ stage of the gate driving unit, the $M^{th}$ stage of the second gate driving unit is actually the $(N+M)^{th}$ stage of the gate driving unit.

Specifically, since the input signal in the first gate driving unit is needed to adopt the output signal of lower stage of the gate driving unit, at least one stage of the second gate driving unit is disposed generally, the number of the second gate driving units is correspondingly determined according to different cascading manners. For example, when the first gate driving unit is connected to the lower M stages of the second gate driving units, M stages of the second gate driving units can be disposed, for example, M can be greater than or equal to 2, M can specifically be 8. For example, the last stage of the first gate driving unit is connected to the signal output terminal or stage transmission signal terminal of the next stage of the gate driving unit, only one stage of the second gate driving unit can be disposed, at this time, M can be 1. However, the embodiment of the present application is not limited thereto, for example, the second gate driving unit also needs the output signal of the lower stage of the second gate driving unit as an input signal, a plurality of stages of the second gate driving units can be disposed.

Specifically, since the number of the start signal lines disposed in different gate driving circuits is different from each other, in the first gate driving unit, some signal terminals connecting to the signal input terminal of the gate driving unit are different from the signal terminals connecting to the signal input terminal of another stage of the gate driving units, it can be the case that the signal terminal connecting to the signal input terminal of one stage of the first gate driving unit is different from the signal terminal connecting to the signal input terminal of another stage of the first gate driving units, it can be the case that the signal terminals connecting to the signal input terminals of a plurality of stages of the first gate driving units are different from the signal terminals connecting to the signal input terminal of another stage of the first gate driving units. For example, only one start signal line STV is disposed in some gate driving circuits to connect to the signal input terminal of the first stage of the first gate driving unit, another stage of the first gate driving units can be connected to the signal output terminals and/or stage transmission signal terminal of another stage of the first gate driving units, or, another stage of the first gate driving units can be connected to the signal output terminal and/or stage transmission signal terminal of the second gate driving unit. In some other gate driving circuits, a plurality of start signal lines are configured to respectively connect to the signal output terminals and/or stage transmission signal terminal of another stage of the first gate driving units, or another stage of the first gate driving units can connect to the signal output terminal and/or stage transmission signal terminal of the second gate driving unit.

Specifically, in the first gate driving unit, since the signal input terminal of at least one stage of the first gate driving unit is needed to be connected to the start signal line, the signal input terminal of at least one stage of the first gate driving unit is not connected to the start signal line, the first gate driving unit can be divided into a first start gate driving unit and a first regular gate driving unit, the signal input terminal of the first start gate driving unit is connected to the start signal line, the signal input terminal of the first regular gate driving unit is connected to the stage transmission signal terminals and the signal output terminal of another stage of the gate driving units. The circuit designs in the first start gate driving unit and the first regular gate driving unit can be the same or different from each other.

Specifically, the signal input terminal in the embodiment of the present application refers to the input terminal (when the first pull-up control module is only connected to one signal terminal, the signal terminal serve as the input terminal of the first pull-up control module, when the first pull-up control module is connected to two signal terminals, both signal terminals serve as the input terminals of the first pull-up control module) of the first pull-up control module (when the first gate driving unit comprises the second pull-up control module, it can be the second pull-up control module, when the second gate driving unit comprises the third pull-up control module, it can also be the third pull-up control module).

Specifically, FIG. 2 illustrates a connection relationship between each of the first gate driving units 211 and the second gate driving unit 212 in the gate driving circuit 21, it can be understood that the embodiment of the present application does not limit the connection relationship between the first gate driving circuit and the second gate driving circuit. According to the difference of the circuit and cascading manner, the connection relationships between each of the first gate driving units and the second gate driving unit may be distinct.

Specifically, the channel width of the transistor in the second gate driving unit 212 is less than the channel width of the corresponding transistor in the first gate driving unit 211, which means that one transistor is disposed in the second gate driving unit 212, and the same transistor is also disposed in the first gate driving unit 211, the channel width of the transistor in the second gate driving unit 212 is less than the channel width of the same transistor in the first gate driving unit 211. For example, the first gate driving unit 211 and the second gate driving unit 212 are both provided with the first pull-up transistor T21, the transistor corresponding to the first pull-up transistor T21 in the second gate driving unit 212 is the first pull-up transistor T21 in the first gate driving unit 211.

In some embodiments, the first gate driving unit comprises the first start gate driving unit and the first regular gate driving unit, a reset transistor is disposed in the first regular gate driving unit, and the gate of the reset transistor is connected to the start signal line, the first start gate driving unit is not provided with the reset transistor, the signal input terminal of the first start gate driving unit is connected to the start signal line.

In some embodiments, the first gate driving unit comprises the first start gate driving unit and the first regular gate driving unit, the first start gate driving unit and the first regular gate driving unit each comprises the reset transistor, and the gate of the reset transistor is connected to a reset signal line, the signal input terminal of the first start gate driving unit is connected to the start signal line STV, the signal input terminal of the first regular driving unit is connected to the signal output terminal and the stage transmission signal terminal in the first gate driving unit.

In some embodiments, as shown from FIG. 1 to FIG. 9, the channel width of the transistor in at least one stage of the second gate driving unit 212 is less than the channel width of the corresponding transistor in the corresponding one or more of the first gate driving units 211 (for example, in FIG. 6 and FIG. 7, the channel width L1 of the first pull-up transistor T21 in the second gate driving unit 212 is less than the channel width L3 of the first pull-up transistor T21 in the first gate driving unit 211). By making the channel width of the transistor of at least one stage of the second gate driving unit 212 less than the channel width of the corresponding transistor in the corresponding one or more of the first gate driving units 21, the space of the lower bezel occupied by the second gate driving unit 212 can be reduced, so that the space for setting other traces in the lower bezel is increased, thereby reducing the risk of short circuit and open circuit of the traces of the lower bezel, increasing the yield of the display panel.

In some embodiments, as shown from FIG. 3 to FIG. 4, from FIG. 6 to FIG. 8, each of the first gate driving units 211 and the second gate driving unit 212 comprises a first pull-up control module 311, a first pull-up module 312 and a first pull-down module 313; the first pull-up module 312 is connected to the first pull-up control module 311 at a first node Q1; the first pull-down module 313 is connected to the first pull-up module 312 at the first node Q1. Wherein, the channel width of at least one transistor in the first pull-up module 312 of the second gate driving unit 212 is less than the channel width of a corresponding transistor in the first pull-up module 312 of the corresponding one or more of the first gate driving units 211 (for example, the channel width L1 of the first pull-up transistor T21 in the first pull-up module 312 of the second gate driving unit 212 is less than the channel width L3 of the first pull-up transistor T21 in the first pull-up module 312 of the first gate driving unit 211). By making the channel width of at least one transistor in the first pull-up module 312 of the second gate driving unit 212 less than the channel width of the corresponding transistor in the first pull-up module 312 of the corresponding one or more of the first gate driving units 211, the space occupied by the second gate driving unit can be reduced, so that the spacing and/or width of the traces and terminals such as fan-out trace and the binding terminal of the binding area can be disposed relatively larger, thereby avoiding the issues of short circuit and open circuit due to excessively small spacing and width of the traces and terminals in the binding area, increasing the yield of the display panel.

Specifically, the first gate driving unit can be as shown in FIG. 3, the circuit design of the second gate driving unit can be as shown in FIG. 4, at this time, the signal output terminal of the first stage of the second gate driving unit is G(N+1), the signal output terminal of the $m^{th}$ stage of the second gate driving unit is G(N+m), m belongs to M, m is greater than or equal to 1, m is less than or equal to M, and m is a positive integer. The same principle can be used to determine other signal terminals. It can be understood that FIG. 3 and FIG. 4 are schematic representations made to distinguish between the first gate driving unit and the second gate driving unit, the actual circuit structures thereof are the same, only the number of stages is different from each other. It can be understood that, when considering the gate driving circuit as (N+M) stages of the gate driving unit, FIG. 3 and FIG. 4 can be combined.

Specifically, as shown in FIG. 3 and FIG. 4, the first pull-up control module 311 comprises a pull-up control transistor T11, in the first gate driving unit 211, when n is 1, the gate and the first electrode of the pull-up control transistor T11 of the $n^{th}$ stage of the first gate driving unit are connected to a start signal line STV. When n is greater than 5, a gate of the pull-up control transistor T11 of the $n^{th}$ stage of the first gate driving unit is connected to a stage transmission signal terminal ST(n−4) of the first 4 stages of the first gate driving unit, and a first electrode of the pull-up control transistor T11 of the $n^{th}$ stage of the first gate driving unit is connected to a signal output terminal G(n−4) of the first 4 stages of the first gate driving unit. In one stage of the second gate driving units 212, a gate of the first pull-up transistor T11 of the $m^{th}$ stage of the second gate driving unit is connected to a stage transmission signal terminal ST(N+M−4) of the first 4 stages of the gate driving unit (which can be either the first gate driving unit or the second gate driving unit), a first electrode of the first pull-up transistor T11 of the $m^{th}$ stage of the second gate driving unit is connected to a signal output terminal G(N+M−4) of the first 4 stages of the gate driving unit (which can be either the first gate driving unit or the second gate driving unit).

Specifically, it can be understood that, when m is less than or equal to 4, the signal output terminal G(N+M−4) corresponds to the signal output terminal of the first gate driving unit, when m is greater than 4, the signal output terminal G(N+M−4) corresponds to the signal output terminal of the second gate driving unit.

Specifically, n belongs to N, n is greater than or equal to 1, n is greater than or equal to N, and n is a positive integer. When n is 2, 3 or 4, a plurality of start signal lines can be configured to be respectively connected to the signal input terminals of the second stage of the first gate driving unit, the third stage of the first gate driving unit and the fourth stage of the first gate driving unit.

Specifically, the gate driving circuit comprises a plurality of gate driving units, a plurality of gate driving units comprise the first gate driving unit and the second gate driving unit, it can be understood that, the $n^{th}$ stage of the first gate driving unit is the $n^{th}$ stage of the gate driving unit; the $m^{th}$ stage of the second gate driving unit is actually the $(N+m)^{th}$ stage of the gate driving unit.

In some embodiments, as shown in FIG. 3, FIG. 4, and from FIG. 6 to FIG. 8, the first pull-up module 312 comprises the first the first pull-up transistor T21 and the second pull-up transistor T22, the gate of the first pull-up transistor T21 is connected to the first node Q1, the first electrode of the first pull-up transistor T21 is connected to a clock signal line CK, the second electrode of the first pull-up transistor T21 is connected to the signal output terminal G(n) of the first gate driving unit 211 or the signal output terminal G(N+m) of the second gate driving unit 212. The gate of the second pull-up transistor T22 is connected to the first node Q1, the first electrode of the second pull-up transistor T22 is connected to a clock signal line CK, the second electrode of the second pull-up transistor T22 is connected to the stage transmission signal terminal ST(n) of the first gate driving unit 211 or the stage transmission signal terminal ST(N+m) of the second gate driving unit 212;

The channel width of the first pull-up transistor T21 in the first gate driving unit 211 is greater than the channel width of the first pull-up transistor T21 in the second gate driving unit 212;

and/or, the channel width of the second pull-up transistor T22 in the first gate driving unit 211 is greater than the channel width of the second pull-up transistor T22 in the second gate driving unit 212. By making the channel width of the first pull-up transistor in the first gate driving unit greater than the channel width of the first pull-up transistor in the second gate driving unit, and/or making the channel width of the second pull-up transistor in the first gate driving unit greater than the channel width of the second pull-up transistor in the second gate driving unit, the space occupied by the second gate driving unit can be reduced, so that the spacing and/or width of the traces and terminals such as fan-out trace and the binding terminal of the binding area can be disposed relatively larger, thereby avoiding the issues of short circuit and open circuit due to excessively small spacing and width of the trace and terminal in the binding area, increasing the yield of the display panel.

Specifically, it can be the case that the channel width of the first pull-up transistor in the first gate driving unit is greater than the channel width of the first pull-up transistor in the second gate driving unit; it can also be the case that the channel width of the second pull-up transistor in the first gate driving unit greater than the channel width of the second pull-up transistor in the second gate driving unit; it can further be the case that the channel width of the first pull-up transistor in the first gate driving unit is greater than the channel width of the first pull-up transistor in the second gate driving unit, and the channel width of the second pull-up transistor in the first gate driving unit is greater than the channel width of the second pull-up transistor in the second gate driving unit.

Specifically, it can be understood that, the display panel is provided with a plurality of clock signal lines, a plurality of clock signal lines are further used to drive each of the gate driving units, for example, only two sides of the display panel are provided with the gate driving circuit, and when the gate driving units in the gate driving circuits on the two sides are correspondingly set to input signal to the same scanning line from two sides, two sets of clock signal lines are set at two sides of the display area, and the two sets of clock signal lines can be disposed symmetrically with same signals. Each set of clock signal lines can comprise a plurality of clock signal lines, a plurality of clock signal lines are further used to achieve the connection to different stages of the gate driving units. For example, a set of clock signal lines comprises 8 clock signal lines, the first gate driving units from the first stage to the eighth stage can be respectively connected to 8 clock signal lines, the first gate driving units from the ninth stage to the sixteenth stage can be respectively connected to the same clock signal lines as the first gate driving units from the first stage to the eighth stage, the same principle can be used to determine the clock signal lines connected to other first gate driving units. As for the second driving unit, it can be understood that, when the number of the first gate driving units is an integer multiple of the number of the clock signal lines, the connection relationship between each of stages of the second gate driving units and the clock signal lines can refer to the connection relationship between the first gate driving unit and the clock signal line. When the number of the first gate driving units is not an integer multiple of the number of the clock signal lines, for example, there are a total of 23 stages of the first gate driving units, the 24th stage of the gate driving unit is the second gate driving unit, the first stage of the second gate driving unit can be connected to the same clock signal line as the eighth stage of the first gate driving unit, the second stage of the second gate driving unit is connected to the same clock signal line as the first stage of the second gate driving unit.

Specifically, as shown in FIG. 6, the display panel 1 comprises a substrate 411, an active layer 412, a gate insulating layer 413, a gate layer 414, an interlayer insulating layer 415 and a source/drain layer 416. Here, the relative positions of the active layer, the gate layer and the source/drain layer are illustrated by using a design of top-gate-bottom-contact, however, the embodiment of the present application is not limited thereto, the relative positions of the gate layer, the active layer and the source/drain layer can be configured for other designs such as the structure of the bottom-gate-top-contact, and the embodiment of the present application only illustrates a single layer of the gate layer, a single layer of the active layer and a single layer of the source/drain layer, the embodiment of the present application is not limited thereto, a plurality of layers of the gate layer, a plurality of layers of the active layer and a plurality of layers of the source/drain layer can be set.

Specifically, as shown in FIG. 8, (a) in FIG. 8 is a stack diagram of the active layer and the source/drain layer in the second gate driving unit 212, (b) in FIG. 8 is a stack diagram of the active layer and the source/drain layer in the first gate driving unit 211. It can be seen from FIG. 8, the active layer 412 comprises an active pattern T21A of the first pull-up transistor T21 of the first gate driving unit 211, an active pattern T22A of the second pull-up transistor T22 of the first gate driving unit 211, an active pattern T21A of the first pull-up transistor T21 of the second gate driving unit 212, and an active pattern T22A of the second pull-up transistor T22 of the second gate driving unit 212. The source/drain layer 416 comprises a first electrode T21S of the first pull-up transistor T21 of the first gate driving unit 211, a second electrode T21D of the first pull-up transistor T21 of the first gate driving unit 211, a first electrode T21S of the second pull-up transistor T22 of the first gate driving unit 211, a second electrode T21D of the second pull-up transistor T22 of the first gate driving unit 211, a first electrode T21S of the first pull-up transistor T21 of the second gate driving unit 212, a second electrode T21D of the first pull-up transistor T21 of the second gate driving unit 212, a first electrode T21S of the second pull-up transistor T22 of the second gate driving unit 212, and second electrode T21D of the second pull-up transistor T22 of the second gate driving unit 212.

It can be seen from FIG. 8, the channel width L3 of the first pull-up transistor T21 in the first gate driving unit 211 is greater than the channel width L1 of the first pull-up transistor T21 in the second gate driving unit 212, the channel width L4 of the second pull-up transistor T22 in the first gate driving unit 211 is greater than the channel width L2 of the second pull-up transistor T22 in the second gate driving unit 212.

It can be seen from FIG. 7, since the channel width of the first pull-up transistor T21 in the second gate driving unit 212 is reduced, the width of the second gate driving unit 212 can be reduced, thereby reducing the area occupied by the second gate driving unit.

In some embodiments, as shown in FIG. 3 and FIG. 4, the first pull-down module 313 comprises a first pull-down transistor T41, in the first gate driving unit 211, the gate of the first pull-down transistor T41 is connected to the stage transmission terminals ST(n+8) of the last 8 stages of the gate driving unit (which can be the first gate driving unit or the second gate driving unit), in the second gate driving unit 212, the gate of the first pull-down transistor T41 is connected to the stage transmission terminals ST(N+m+8) of the last 8 stages of the second gate driving units, the first electrode of the first pull-down transistor T41 is connected to the first low-potential power terminal VSSQ, the second electrode of the first pull-down transistor T41 is connected to the first node Q1.

Specifically, the first pull-down module 313 can further comprise a second pull-down transistor, the gate of the second pull-down transistor is connected to the gate of the first pull-down transistor, the first electrode of the second pull-down transistor is connected to the second low-potential power terminal VSSG, the second electrode of the second pull-down transistor is connected to the signal output terminal G(n) of the first gate driving unit 211 or the signal output terminal G(N+m) of the second gate driving unit 212.

Specifically, the embodiment of the present application uses an example in which the first low-potential power terminal and the second low-potential power terminal are disposed in the gate driving circuit, however, the embodiment of the present application is not limited thereto, only one low-potential power terminal can be provided.

In some embodiments, as shown in FIG. 3 and FIG. 4, each of the first gate driving units 211 and the second gate driving unit 212 comprises a pull-down sustaining module 314, the pull-down sustaining module 314 comprises a first pull-down sustaining module 314*a* and a second pull-down sustaining module 314*b*, the first pull-down sustaining module 314*a* comprises a first pull-down sustaining transistor T32, a second pull-down sustaining transistor T42, a third pull-down sustaining transistor T72, a first inverse transistor T51, a second inverse transistor T52, a third inverse transistor T53 and a fourth inverse transistor T54, the gate of the first pull-down sustaining transistor T32 is connected to a third node P, the first electrode of the first pull-down sustaining transistor T32 is connected to the signal output terminal G(n) of the first gate driving unit 211 or the signal output terminal G(N+m) of the second gate driving unit 212. The gate of the second pull-down sustaining transistor T42 is connected to the third node P, the first electrode of the second pull-down sustaining transistor T42 is connected to the first low-potential power terminal VSSQ, the second electrode of the second pull-down sustaining transistor T42 is connected to the first node Q1. The gate of the third pull-down sustaining transistor T72 is connected to the third node P, the first electrode of the third pull-down sustaining transistor T72 is connected to the first low-potential power terminal VSSQ, the second electrode of the third pull-down sustaining transistor T72 is connected to the stage transmission terminal ST(n) of the first gate driving unit 211 or the stage transmission terminal ST(N+m) of the second driving unit 212, the gate of the first inverse transistor T51 and the first electrode of the first inverse transistor T51 are connected to a first low frequency signal terminal LC1, the second electrode of the first inverse transistor T51 and the second electrode of the second inverse transistor T52 are connected to the gate of the third inverse transistor T53, the gate of the second inverse transistor T52 is connected to the first node Q1, the first electrode of the second inverse transistor T52 is connected to the first low-potential power terminal VSSQ, the first electrode of the third inverse transistor T53 is connected to the first low frequency signal terminal LC1, the second electrode of the third inverse transistor T53 is connected to the second electrode of the fourth inverse transistor T54, the gate of the fourth inverse transistor T54 is connected to the first node Q1, the first electrode of the fourth inverse transistor T54 is connected to the first low-potential power terminal VSSQ.

The second pull-down sustaining module 314*b* comprises a fourth pull-down sustaining transistor T33, a fifth pull-down sustaining transistor T43, a sixth pull-down sustaining transistor T73, a fifth inverse transistor T61, a sixth inverse transistor T62, a seventh inverse transistor T63 and a eighth inverse transistor T64, the gate of the fourth pull-down sustaining transistor T33 is connected to a fourth node O, the first electrode of the fourth pull-down sustaining transistor T33 is connected to the second low-potential power terminal VSSG, the second electrode of the fourth pull-down sustaining transistor T33 is connected to the signal output terminal G(n) of the first gate driving unit 211 or the signal output terminal G(N+m) of the second gate driving unit 212. The gate of the fifth pull-down sustaining transistor T43 is connected to fourth node O, the first electrode of the fifth pull-down sustaining transistor T43 is connected to the first low-potential power terminal VSSQ, the second electrode of the fifth pull-down sustaining transistor T43 is connected to the first node Q1. The gate of the sixth pull-down sustaining transistor T73 is connected to the fourth node O, the first electrode of the sixth pull-down sustaining transistor T73 is connected to the first low-potential power terminal VSSQ, the second electrode of the sixth pull-down sustaining transistor T73 is connected to the stage transmission signal terminal ST(n) of the first gate driving unit 211 or the stage transmission signal terminal ST(N+m) of the second gate driving unit, the gate of the fifth inverse transistor T61 and the first electrode of the fifth inverse transistor T61 are connected to the second low frequency signal terminal LC2, the second electrode of the fifth inverse transistor T61 is connected to the second electrode of the sixth inverse transistor T62 and the gate of the seventh inverse transistor T63, the gate of the sixth inverse transistor T62 is connected to the first node Q1, the first electrode of the sixth inverse transistor T62 is connected to the first low-potential power terminal VSSQ, the first electrode of the seventh inverse transistor T63 is connected to the first low frequency signal terminal LC1, the second electrode of the seventh inverse transistor T63 is connected to the second electrode of the eighth inverse transistor T64, the gate of the eighth inverse transistor T64 is connected to the first node Q1, the first electrode of the eighth inverse transistor T64 is connected to the first low-potential power terminal VSSQ.

Specifically, the first pull-down sustaining module 314*a* further comprises a first node pull-down transistor T55 and a second node pull-down transistor T56, the gate of the first node pull-down transistor T55 is connected to a fifth node Q3, the first electrode of the first node pull-down transistor T55 is connected to the second node of the second inverse transistor T52. The gate of the second node pull-down transistor T56 is connected to the fifth node Q3, the first electrode of the second pull-down transistor T56 is connected to the first low-potential power terminal VSSQ, the second electrode of the second node pull-down transistor T56 is connected to the third node P.

Specifically, the second pull-down sustaining module 314*b* further comprises a third node pull-down transistor T65 and a fourth node pull-down transistor T66, the gate of the third node pull-down transistor T65 is connected to the fifth node Q3, the first electrode of the third node pull-down transistor T65 is connected to the first low-potential power terminal VSSQ, the second electrode of the third node pull-down transistor T65 is connected to the second electrode of the sixth inverse transistor T62. The gate of the fourth node pull-down transistor T66 is connected to the fifth node Q3, the first electrode of the fourth node pull-down transistor T66 is connected to the first low-potential power terminal VSSQ, the second electrode of the fourth node pull-down transistor T66 is connected to the fourth node O.

Specifically, the fifth node Q3 is the first node Q1 in the upper two stages of the gate driving units.

In some embodiments, as shown in FIG. 3 and FIG. 4, each of the first gate driving units 211 and the second gate driving unit 212 comprises a reset module 315, the reset module 315 comprises a reset transistor Tr, the gate of the reset transistor Tr is connected to a reset signal line Reset or the start signal line STV, the first electrode of the reset transistor Tr is connected to the first low-potential power terminal VSSQ, the second electrode of the reset transistor Tr is connected to the first node Q1.

Specifically, as shown in FIG. 3, the gate and the first electrode of the pull-up control transistor T11 of the first stage of the first gate driving unit are connected to the start signal line STV, the gate of the pull-up control transistor T11 of the $n^{th}$ stage of the first gate driving unit is connected to the stage transmission terminal ST(n−4) of the first 4 stages of the first gate driving unit, the gate of the pull-up control transistor T11 of the $n^{th}$ stage of the first gate driving unit is connected to the signal output terminal G(n−4) of the first 4 stages of the first gate driving unit. When the reset transistor Tr is connected to the start signal line STV, the first stage of the first gate driving unit cannot be provided with the reset transistor Tr, or making the reset transistor Tr of the first gate driving unit connect to the reset signal line Reset; when the reset transistor Tr is connected to the reset signal line Reset, the reset transistor Tr of the first stage of the first gate driving unit is also connected to the reset signal line Reset.

Specifically, as shown in FIG. 3 and FIG. 4, each of the first gate driving units 211 and the second gate driving unit 212 comprises a storage capacitor Cbt, an electrode plate of the storage capacitor Cbt is connected to the first node Q1, the other electrode plate of the storage capacitor is connected to the signal output terminal G(n) of the first gate driving unit 211 or the signal output terminal G(N+m) of the second gate driving unit 212.

Specifically, the channel width of the first pull-up transistor in the second gate driving unit is 0.7 to 0.9 times the channel width of the first pull-up transistor in the corresponding one or more of the first gate driving units, in particular, it can be 0.8 times.

Specifically, the channel width of the second pull-up transistor in the second gate driving unit is 0.7 to 0.9 times the channel width of the second pull-up transistor in the corresponding one or more of the first gate driving units, in particular, it can be 0.8 times.

Under the condition that the electrical structure of the first gate driving unit and the second gate driving unit are the same as each other, the second pull-down transistors T31 are disposed in the first gate driving unit and the second gate driving unit, the channel width of the first pull-up transistor in the second gate driving unit is 0.8 times the channel width of the first pull-up transistor in the corresponding one or more of the first gate driving units, the channel width of the second pull-up transistor in the second gate driving unit is 0.8 times the channel width of the second pull-up transistor in the corresponding one or more of the first gate driving units, conduct tests on the gate driving units to obtain the following Table 1:

TABLE 1

| test results of the gate driving unit | | | | | |
|---|---|---|---|---|---|
| Size design | | | Simulation evaluation | | |
| Transistor name | First gate driving unit | Second gate driving unit | Project | First gate driving unit | Second gate driving unit |
| T11 | W11 | W11 | VGH | A+ | A+ |
| T21 | W21 | W21*0.8 | Margin | | |
| T22 | W22 | W22*0.8 | Von | A+ | A+ |
| T31 | W31 | W31 | Margin | | |
| T32/T33 | W32 | W32 | P Shift | A+ | A+ |
| T41 | W41 | W41 | Margin | | |
| T42/T43 | W42 | W42 | N Shift | A+ | A+ |
| T44 | W44 | W44 | Margin | | |
| T51/T61 | W51 | W51 | HT | A+ | A+ |
| T52/T62 | W52 | W52 | Margin | | |
| T53/T63 | W53 | W53 | LT | A+ | A+ |
| T54/T64 | W54 | W54 | Margin | | |
| T55/T65 | W55 | W55 | RA | A+ | A+ |
| T56/T66 | W56 | W56 | Margin | | |
| T72/T73 | W72 | W72 | | | |

Wherein, the "Size design" column refers to the channel width design of each of the transistors in FIG. 3 and FIG. 4, "W11" refers to the channel width of the first pull-up control transistor T11, the same principle can be used to determine the meanings of other parameters. The difference between the first gate driving unit and the second gate driving unit is that the channel width of the first pull-up transistor T21 in the first gate driving unit is W21, the channel width of the first pull-up transistor T21 in the second gate driving unit is W21*0.8, the channel width of the second pull-up transistor T22 in the first gate driving unit is W22, the channel width of the second pull-up transistor T22 in the second gate driving unit is W22*0.8. The "Simulation evaluation" column refers to the data obtained from simulation evaluation of the display device, the "Project" column refers to the test project, "VGH Margin" refers to the normal operation simulation at the highest voltage, "Von Margin" refers to the on-state voltage boundary simulation, "P Shift Margin" refers to positive threshold voltage shift simulation, "N Shift Margin" refers to negative threshold voltage shift simulation, "HT Margin" refers to high temperature simulation, "LT Margin" refers to low temperature simulation, "RA Margin" refers to reliability simulation. From the simulation results, all of the simulation results of each of the transistors are "A+", which indicates good performance. Thus, without affecting the performance of the display panel, the space occupied by the second gate driving unit is reduced, increasing the yield of the display panel.

In some embodiments, as shown from FIG. 1 to FIG. 9, the number of the transistors in at least one stage of the second gate driving unit 212 is less than the number of the transistors in the corresponding one or more of the first gate driving units 211 (for example, in FIG. 3 and FIG. 4, there are only 4 transistors in the second gate driving 212, there are 19 transistors in the first gate driving unit). By making the number of the transistors in at least one stage of the second gate driving unit 212 less than the number of the transistors in the corresponding one or more of the first gate driving units 211, the space of the lower bezel occupied by the second gate driving unit 212 can be reduced, so that the space for setting other traces in the lower bezel is increased, thereby reducing the risk of short circuit and open circuit of the traces of the lower bezel, increasing the yield of the display panel.

In some embodiments, as shown in FIG. 3 and FIG. 5, the first gate driving unit 211 comprises a second pull-up control module 311*a*, a second pull-up module 312*a*, a second pull-down module 313*a* and a pull-down sustaining module 314, the second pull-up module 312*a* is connected to the second pull-up control module 311*a* at the first node Q1, the second pull-down module 313*a* is connected to the second pull-up module 312*a* at the first node Q1, the pull-down sustaining module 314 is connected to the second pull-up module 312*a* at the first node Q1.

The second gate driving unit 212 comprises a third pull-up control module 321, a third pull-up module 322 and a third pull-down module 323, the third pull-up module 322 is connected to the third pull-up control module 321 at a second node Q2, the third pull-down module 323 is connected to the third pull-up module 322 at the second node Q2.

The number of the transistors in the third pull-up module 322 is less than the number of the transistors in the second pull-up module 312*a*; and/or the second gate driving unit 212 is not provided with the pull-down sustaining module 314. By making the number of the transistors in the third pull-up module less than the number of the transistors in the second pull-up module, and/or by disposing no pull-down sustaining module 314 in the second gate driving unit 212, the number of the transistors in the second gate driving unit can be reduced, so that the space occupied by the second gate driving unit can be reduced, avoiding the issues of short circuit and open circuit due to excessively small spacing and width of the trace and terminal in the binding area, increasing the yield of the display panel.

Specifically, it can be the case that the number of the transistors in the third pull-up module is less than the number of the transistors in the second pull-up module; it can be the case that the number of the transistors in the third pull-up module is equal to the number of the transistors in the second pull-up module, and the second gate driving unit is not provide with the pull-down sustaining module; it can further be the case that the number of the transistors in the third pull-up module is less than the number of the transistors in the second pull-up module, and the second gate driving unit is not provided with the pull-down sustaining module.

Specifically, the second gate driving unit 212 is not provided with the stage transmission signal terminal, by setting no transmission signal terminal in the second gate driving unit 212, the number of the signal lines can be reduced, the space occupied by the second gate driving unit can be reduced, and the transistor connected to the stage transmission signal terminal can be removed, further reducing the space occupied by the second gate driving unit.

In some embodiments, as shown in FIG. 3 and FIG. 5, in the first gate driving unit 211, the second pull-up module 312*a* comprises a first pull-up transistor T21 and a second pull-up transistor T22, the first pull-up transistor T21 is electrically connected to the signal output terminal G(n) of the first gate driving unit 211, in the second gate driving unit 212, the third pull-up module 322 comprises the first pull-up transistor T21, the first pull-up transistor T21 is electrically connected to the signal output terminal G(N+m) of the second gate driving unit 212. By setting no second pull-up transistor in the second gate driving unit, the pace occupied by the second gate driving unit can be reduced, avoiding the issues of short circuit and open circuit due to excessively small spacing and width of the trace and terminal in the binding area, increasing the yield of the display panel.

Specifically, as shown in FIG. 3, the connection relationship of the first pull-up transistor T21 and the second pull-up transistor T22 with each of the traces, transistors, nodes and signal terminals in the first gate driving unit 211 can be referred to the connection relationship of the first pull-up transistor T21 and the second pull-up transistor T22 with each of the traces, transistors, nodes and signal terminals in the aforementioned embodiment. As shown in FIG. 5, in the second gate driving unit 212, the gate of the first pull-up transistor T21 is connected to the second node Q2, the first electrode of the first pull-up transistor T21 is connected to the clock signal line CK, the second electrode of the first pull-up transistor T21 is connected to the signal output terminal G (n) o the first gate driving unit 211 or the signal output terminal G(N+m) of the second gate driving unit 212.

In some embodiments, as shown in FIG. 3 and FIG. 5, the second pull-up control module 311*a* comprises a pull-up control transistor T11, the third pull-up control module 321 comprises the pull-up control transistor T11, in the first gate driving unit 211, the gate of the pull-up control transistor T11 is connected to the stage transmission terminal of another stage of the first gate driving units 211, the first electrode of the pull-up control transistor T11 is connected to the signal output terminal of another stage of the first gate driving units 211;

in one stage of the second gate driving units 212, the gate of the pull-up control transistor T11 and the first electrode of the pull-up control transistor T11 are connected to the signal output terminal of another stage of the first gate driving units 211 or the signal output terminal of another stage of the second gate driving units 212.

Specifically, as shown in FIG. 3, the connection relationship of the pull-up control transistor T11 with each of the traces, transistors, nodes and signal terminals in the first gate driving unit 211 can be referred to the connection relationship of the pull-up control transistor T11 with each of the traces, transistors, nodes and signal terminals in the aforementioned embodiment. As shown in FIG. 5, in the second gate driving unit 212, the gate and the first electrode of the pull-up control transistor T11 of the $m^{th}$ stage of the second gate driving unit is connected to the signal output terminal G(N+m-X) of the first X stages of the gate driving units (which can be the first gate driving unit or the second gate driving unit).

Specifically, X is greater than or equal to 1, and X is a positive integer. Specifically, X can be half of the number of the clock signal lines in a set of clock signal lines, for example, the gate driving circuit at one side is connected to a set of clock signal lines, the number of the clock signal lines of a set of clock signal lines is 8, X can be 4.

In some embodiments, as shown in FIG. 3 and FIG. 5, in the first gate driving unit 211, the second pull-down module 313*a* comprises a first pull-down transistor T41, the gate of the first pull-down transistor T41 is connected to the stage transmission signal terminal of another stage of the first gate driving units 211 or the signal output terminal of another stage of the second gate driving units 212;

in one stage of the second gate driving units 212, the third pull-down module 323 comprises the first pull-down transistor T41, the gate of the first pull-down transistor T41 is connected to the signal output terminal of another stage of the second gate driving units 212.

Specifically, as shown in FIG. 3, the connection relationship of the first pull-down transistor T41 with each of the traces, transistors, nodes and signal terminals in the first gate driving unit 211 can be referred to the connection relationship of the first pull-down transistor T41 with each of the traces, transistors, nodes and signal terminals in the aforementioned embodiment. As shown in FIG. 5, in the second gate driving unit 212, the gate of the first pull-down transistor T41 of the $m^{th}$ stage of the second gate driving unit 212 is connected to the signal output terminal G(N+m+X) of the last X stages of the second gate driving unit, the first electrode of the first pull-down transistor T41 of the $m^{th}$ stage of the second gate driving unit 212 is connected to the first low-potential power terminal VSSQ, the second electrode of the first pull-down transistor T41 of the $m^{th}$ stage of the second gate driving unit 212 is connected to the second node Q2.

In some embodiments, as shown in FIG. 5, in the second gate driving unit 212, the third pull-down module 323 further comprises a second pull-down transistor T31, the gate of the second pull-down transistor T31 is connected to the gate of the first pull-down transistor T41, the second pull-down transistor T31 is connected to the signal output terminal of the second gate driving unit 212, the second pull-down transistor T31 is electrically connected to the second node Q2.

Specifically, as shown in FIG. 5, the gate of the second pull-down transistor T31 of the $m^{th}$ stage of the second driving unit 212 is connected to the signal output terminal G(N+m+X) of the last X stages of the second gate driving unit, the first electrode of the second pull-down transistor T31 of the $m^{th}$ stage of the second driving unit 212 is connected to the first low-potential power terminal VSSQ, the second electrode of the second pull-down transistor T31 of the $m^{th}$ stage of the second driving unit 212 is connected to the signal output terminal G(N+m) of this stage of the second gate driving unit.

Specifically the second pull-down module 313*a* in the first gate driving unit can further comprises the second pull-down transistor, the gate of the second pull-down transistor is connected to the gate of the first pull-down transistor, the first electrode of the second pull-down transistor is connected to the second low-potential power terminal VSSG, the second electrode of the second pull-down transistor is connected to the signal output terminal G(n) of the first gate driving unit 211.

Specifically, the design and the connection relationship of the transistor in the pull-down sustaining module 314 can be referred to the aforementioned embodiment, which will not be described again here.

Specifically, the aforementioned embodiment is explained by using an example in which the second gate driving unit is not provided with the pull-down sustaining module, however, the embodiment of the present application is not limited thereto, in the second gate driving unit, it can only remove some of transistors in the pull-down sustaining module, for example, the pull-down sustaining module is disposed in the second gate driving unit, the third pull-down sustaining transistor T72 and the sixth pull-down sustaining transistor T73 are not disposed in the pull-down sustaining module.

In some embodiments, as shown in FIG. 3, the first gate driving unit 211 further comprises a reset module 315, the reset module 315 is connected to the first pull-up control module 311 at the first node Q1.

Specifically, as shown in FIG. 3, the connection relationship of the reset transistor Tr with each of the traces, transistors, nodes and signal terminals in the reset module 315 can be referred to the connection relationship of the reset transistor Tr with each of the traces, transistors, nodes and signal terminals in the aforementioned embodiment.

In some embodiments, as shown in FIG. 5, the second gate driving unit 212 is not provided with the reset module 315. By setting no reset module in the second gate driving unit, the space occupied by the second gate driving unit can further be reduced, thereby avoiding the issues of short circuit and open circuit due to excessively small spacing and width of the trace and terminal in the binding area, increasing the yield of the display panel.

In some embodiments, as shown in FIG. 3 and FIG. 5, the first gate driving unit 211 further comprises a storage capacitor Cbt, the second gate driving unit is not provided with the storage capacitor. By setting no storage capacitor in the second gate driving unit, the space occupied by the second gate driving unit can further be reduced, thereby avoiding the issues of short circuit and open circuit due to excessively small spacing and width of the trace and terminal in the binding area, increasing the yield of the display panel.

In some embodiments, the display panel 1 comprises a plurality of stages of the second gate driving units 212, each of the stages of the second gate driving units 212 is the same, or, each of the stages of the second gate driving units 212 is different from each other.

Specifically, since the gate driving circuits in different display panels are different from each other, correspondingly, different numbers of the second gate driving units are needed to be set to output stage transmission signal, one stage of the second gate driving unit or a plurality of stages of the second gate driving units can be set correspondingly. When a plurality of stages of the second gate driving units are set, each of the stages of the second gate driving units can be the same, for example, all adopting the design in FIG. 4 or FIG. 5, it is also possible for some of the second gate driving units to be different, for example, one stage of the second gate driving unit adopts the design in FIG. 4, FIG. 7 and FIG. 8, one stage of the second gate driving unit adopts the design in FIG. 5. Specifically, the aforementioned embodiments use an example in which the channel width of the transistor in at least one stage of the second gate driving unit is less than the channel width of the corresponding transistor in the corresponding one or more of the first gate driving units, the number of the transistors in at least one stage of the second gate driving unit is less than the number of the transistors in the corresponding one or more of the first gate driving units, it can be understood that, when there are not conflicts between each of the embodiments, each of the embodiments can be combined or split and then recombined, for example, the first gate driving unit comprises a second pull-up control module, a second pull-up module, a second pull-down module and a pull-down sustaining module, the second pull-up module is connected to the second pull-up control module at the first node, the second pull-down module is connected to the second pull-up module at the first node, the pull-down sustaining module is connected to the second pull-up module at the first node; the second gate driving unit comprises a third pull-up control module, a third pull-up module and a third pull-down module, the third pull-up module is connected to the third pull-up control module at a second node, the third pull-down module is connected to the third pull-up module at the second node; wherein the number of the transistors in the third pull-up module is less than the number of the transistors in the second pull-up module; the second pull-up module comprises a first pull-up transistor, the third pull-up module comprises a first pull-up transistor, the channel width of the first pull-up transistor in the corresponding one or more of the first gate driving unit is greater than the channel width of the first pull-up transistor in the second gate driving unit.

In another example, the first gate driving unit comprises a second pull-up control module, a second pull-up module, a second pull-down module, a pull-down sustaining module and a reset module, the second pull-up module is connected to the second pull-up control module at a first node, the second pull-down module is connected to the second pull-up module at the first node, the pull-down sustaining module is connected to the second pull-up module at the first node; the second gate driving unit comprises a third pull-up control module, a third pull-up module and a third pull-down module, the third pull-up module is connected to the third pull-up control module at a second node, the third pull-down module is connected to the third pull-up module at the second node; wherein the number of the transistors in the third pull-up module is less than the number of the transistors in the second pull-up module; and/or the second gate driving unit is not provided with at least one of the pull-down sustaining module and the reset module.

When the gate driving unit adopts the circuit design shown in FIG. 3 and FIG. 5, test on the display panel can be conducted to obtain FIG. 9, the horizontal axis in FIG. 9 represents time in microseconds, the vertical axis represents voltage in volts, curve 01 represents the clock timing of the signal output terminal of the second gate driving unit. It can be seen that, the clock timing of the second gate driving unit and the clock timing of the first gate driving unit are close or even the same, illustrating that the embodiment of the present application can ensure the normal operation of the gate driving unit.

Specifically, each of the transistors in the embodiment of the present application can be N-type transistor.

Specifically, each of the transistors in the embodiment of the present application can be a silicon semiconductor transistor (such as a low-temperature polycrystalline silicon thin film transistor), thereby reducing power consumption. However, the embodiment of the present application is not limited thereto. Each of the transistors can be an oxide semiconductor transistor (such as an indium gallium zinc oxide thin film transistor), or some of the transistors can be a silicon semiconductor transistor (such as a low-temperature polycrystalline silicon thin film transistor), and some of the transistors can be an oxide semiconductor transistor (such as an indium gallium zinc oxide thin film transistor).

Specifically, the first electrode can be a source and the second electrode can be a drain; or the first electrode can be a drain and the second electrode can be a source.

At the same time, the embodiment of the present application provides a display device, the display device comprises a display panel as described in any of the above-mentioned embodiments.

In the description of this application, the terms "first" and "second" are used for descriptive purposes only, and cannot be understood as indicating or implying relative importance or implicitly indicating the number of indicated technical features. Therefore, the features defined as "first" and "second" may explicitly or implicitly include one or more features. In the description of this application, "plurality" means two or more than two, unless otherwise explicitly and specifically limited.

In the above embodiments, each embodiment is described with its own emphasis. For parts that are not described in detail in a certain embodiment, please refer to the relevant descriptions of other embodiments.

The embodiments, implementation modes and related technical features of the present application can be combined and replaced with each other without conflict.

The above are only preferred embodiments of the present application and do not impose any form of limitation on it. However, any simple modifications or equivalents to the above embodiments may be made based on the technical essence of the present application without departing from the content of the technical solution of the present application. Changes and modifications still fall within the scope of the technical solution of this application.

The invention claimed is:

1. A display panel, comprising: a gate driving circuit, the gate driving circuit comprises a plurality of stages of first gate driving units in a cascaded configuration and at least one stage of second gate driving unit, each of the first gate driving units is configured to output a scanning signal, the second gate driving unit is configured to output a stage transmission signal to a corresponding one or more of the first gate driving units;

wherein in a direction perpendicular to the arrangement direction of each of the stages of the first gate driving units, a width of the second gate driving unit is less than a width of the corresponding one or more of the first gate driving units;

wherein a channel width of a transistor in at least one stage of the second gate driving unit is less than a channel width of a corresponding transistor in the corresponding one or more of the first gate driving units, and wherein each of the first gate driving units and the second gate driving unit comprises:

a first pull-up control module;

a first pull-up module, the first pull-up module is connected to the first pull-up control module at a first node;

a first pull-down module, the first pull-down module is connected to the first pull-up module at the first node:

wherein the channel width of at least one transistor in the first pull-up module of the second gate driving unit is less than the channel width of a corresponding transistor in the first pull-up module of the corresponding one or more of the first gate driving units, and wherein the first pull-up module comprises:

a first pull-up transistor, the gate of the first pull-up transistor is connected to the first node, a first electrode of the first pull-up transistor is connected to a clock signal line, a second electrode of the first pull-up transistor is connected to a signal output terminal of the first gate driving unit or a signal output terminal of the second gate driving unit;

a second pull-up transistor, the gate of the second pull-up transistor is connected to the first node, a first electrode of the second pull-up transistor is connected to a clock signal line, a second electrode of the second pull-up transistor is connected to a stage transmission signal terminal of the first gate driving unit or a stage transmission signal terminal of the second gate driving unit;

wherein the channel width of the first pull-up transistor in the first gate driving unit is greater than the channel width of the first pull-up transistor in the second gate driving unit, and/or, the channel width of the second pull-up transistor in the first gate driving unit is greater than the channel width of the second pull-up transistor in the second gate driving unit.

2. The display panel of claim 1, wherein the first gate driving unit comprises a second pull-up control module, a second pull-up module, a second pull-down module and a pull-down sustaining module, the second pull-up module is connected to the second pull-up control module at a first node, the second pull-down module is connected to the second pull-up module at the first node, the pull-down sustaining module is connected to the second pull-up module at the first node; the second gate driving unit comprises a third pull-up control module, a third pull-up module and a third pull-down module, the third pull-up module is connected to the third pull-up control module at a second node, the third pull-down module is connected to the third pull-up module at the second node; wherein the number of the transistors in the third pull-up module is less than the number of the transistors in the second pull-up module; and/or, the second gate driving unit is not provided with the pull-down sustaining module.

3. The display panel according to claim 2, wherein in the first gate driving unit, the second pull-up module comprises a first pull-up transistor and a second pull-up transistor, the first pull-up transistor is electrically connected to the signal output terminal of the first gate driving unit;

in the second gate driving unit, the third pull-up module comprises a first pull-up transistor, the first pull-up transistor is electrically connected to the signal output terminal of the second gate driving unit.

4. The display panel according to claim 2, wherein the display panel comprises a plurality of stages of the second gate driving units, the second pull-up control module comprises a pull-up control transistor, the third pull-up control module comprises the pull-up control transistor, in the first gate driving unit, a gate of the pull-up control transistor is connected to a stage transmission signal terminal of another stage of the first gate driving units, a first electrode of the pull-up control transistor is connected to a signal output terminal of the another stage of the first gate driving units;

in one stage of the second gate driving units, the gate of the pull-up control transistor and a first electrode of the pull-up control transistor are connected to a signal output terminal of another stage of the first gate driving units or a signal output terminal of another stage of the second gate driving units.

5. The display panel according to claim 2, wherein the display panel comprises a plurality of stages of the second gate driving units, in the first gate driving unit, the second pull-down module comprises a first pull-down transistor, the gate of the first pull-down transistor is connected to a stage transmission signal terminal of another stage of the first gate driving units or a signal output terminal of another stage of the second gate driving units;

in one stage of the second gate driving units, the third pull-down module comprises the first pull-down transistor, the gate of the first pull-down transistor is connected to a signal output terminal of the another stage of the second gate driving units.

6. The display panel according to claim 2, wherein in the second gate driving unit, the third pull-down module further comprises a second pull-down transistor, the gate of the second pull-down transistor is connected to the gate of the first pull-down transistor, the second pull-down transistor is connected to the signal output terminal of the second gate driving unit, the first pull-down transistor is electrically connected to the second node.

7. The display panel according to claim 2, wherein the first gate driving unit further comprises a reset module, the reset module is connected to the second pull-up control module at the first node.

8. The display panel according to claim 7, wherein the second gate driving unit is not provided with the reset module.

9. A display device, wherein the display device comprises a display panel, the display panel comprises a gate driving circuit, the gate driving circuit comprises a plurality of stages of first gate driving units in a cascaded configuration and at least one stage of second gate driving unit, each of the first gate driving units is configured to output a scanning signal, the second gate driving unit is configured to output a stage transmission signal to a corresponding one or more of the first gate driving units;

wherein in a direction perpendicular to the arrangement direction of each of the stages of the first gate driving units, a width of the second gate driving unit is less than a width of the corresponding one or more of the first gate driving units;

wherein the channel width of the transistor in at least one stage of the second gate driving unit is less than the channel width of the corresponding transistor in the first gate driving units, and wherein each of the first gate driving units and the second gate driving unit comprises;

a first pull-up control module:

a first pull-up module, the first pull-up module is connected to the first pull-up control module at a first node;

a first pull-down module, the first pull-down module is connected to the first pull-up module at the first node;

wherein the channel width of at least one transistor in the first pull-up module of the second gate driving unit is less than the channel width of a corresponding transistor in the first pull-up module of the corresponding one or more of the first gate driving units, and wherein the first pull-up module comprises:

a first pull-up transistor, the gate of the first pull-up transistor is connected to the first node, a first electrode of the first pull-up transistor is connected to a clock signal line, a second electrode of the first pull-up transistor is connected to a signal output terminal of the first gate driving unit or a signal output terminal of the second gate driving unit;

a second pull-up transistor, the gate of the second pull-up transistor is connected to the first node, a first electrode of the second pull-up transistor is connected to a clock signal line, a second electrode of the second pull-up transistor is connected to a stage transmission signal terminal of the first gate driving unit or a stage transmission signal terminal of the second gate driving unit;

wherein the channel width of the first pull-up transistor in the first gate driving unit is greater than the channel width of the first pull-up transistor in the second gate driving unit, and/or, the channel width of the second pull-up transistor in the first gate driving unit is greater than the channel width of the second pull-up transistor in the second gate driving unit.

* * * * *